United States Patent
Brown et al.

(10) Patent No.: US 7,130,411 B2
(45) Date of Patent: Oct. 31, 2006

(54) HOLD QUEUE POSITION PUBLICATION

(75) Inventors: Michael Wayne Brown, Georgetown, TX (US); David R. Cheng, Wilmington, DE (US); Wing-Ying Stephanie Leung, Ann Arbor, MI (US); Folu Okunseinde, Oakhurst, NJ (US); Michael A. Paolini, Austin, TX (US); Seema Sheth-Voss, Cambridge, MA (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 10/005,680

(22) Filed: Dec. 3, 2001

(65) Prior Publication Data
US 2003/0103620 A1    Jun. 5, 2003

(51) Int. Cl.
*H04M 3/523* (2006.01)
*H04Q 3/64* (2006.01)

(52) U.S. Cl. ............................. 379/266.01; 379/226.06
(58) Field of Classification Search ........... 379/266.01, 379/309, 76, 215.01, 265.02–266.1, 266.06, 379/266.03; 709/202–205
See application file for complete search history.

(56) References Cited

U.S. PATENT DOCUMENTS

| | | | |
|---|---|---|---|
| 4,788,715 A | 11/1988 | Lee | 379/84 |
| 5,020,095 A | 5/1991 | Morganstein et al. | 379/67 |
| 5,166,974 A | 11/1992 | Morganstein et al. | 379/67 |
| 5,444,774 A | 8/1995 | Friedes | 379/266 |
| 5,506,898 A | 4/1996 | Costantini et al. | 379/266 |
| 5,796,791 A | 8/1998 | Polcyn | 379/265 |
| 5,802,526 A * | 9/1998 | Fawcett et al. | 707/104.1 |
| 5,864,616 A | 1/1999 | Hartmeier | 379/266 |
| 5,867,572 A | 2/1999 | MacDonald et al. | 379/266 |
| 5,875,231 A | 2/1999 | Farfan et al. | |
| 5,903,642 A * | 5/1999 | Schwartz et al. | 379/309 |
| 5,946,388 A * | 8/1999 | Walker et al. | 379/266.01 |
| 5,956,024 A * | 9/1999 | Strickland et al. | 345/717 |
| 5,978,467 A * | 11/1999 | Walker et al. | 379/266.01 |
| 6,064,730 A | 5/2000 | Ginsberg | 379/265 |
| 6,141,328 A | 10/2000 | Nabkel et al. | 370/259 |
| 6,195,426 B1 * | 2/2001 | Bolduc et al. | 379/266.01 |
| 6,259,771 B1 | 7/2001 | Kredo et al. | 379/88.17 |
| 6,400,804 B1 * | 6/2002 | Bilder | 379/76 |
| 6,539,080 B1 * | 3/2003 | Bruce et al. | 379/88.17 |
| 6,707,906 B1 * | 3/2004 | Ben-Chanoch | 379/266.07 |
| 6,738,473 B1 * | 5/2004 | Burg et al. | 379/266.01 |
| 2002/0055967 A1 * | 5/2002 | Coussement | 709/202 |
| 2002/0055975 A1 * | 5/2002 | Petrovykh | 709/205 |

FOREIGN PATENT DOCUMENTS

JP         4245754 A      9/1992

OTHER PUBLICATIONS

U.S. Appl. No. 10/005,733.
U.S. Appl. No. 10/006,004.
U.S. Appl. No. 10/004,664.
U.S. Appl. No. 10/005,828.

* cited by examiner

*Primary Examiner*—Harry S. Hong
(74) *Attorney, Agent, or Firm*—Mark S. Walker; Amy J. Pattillo (57) ABSTRACT

A method, system, and program for publishing hold queue characteristics are provided. Characteristics of an on hold system are monitored. Then, responsive to a selection by a caller of a format and interface for publishing the characteristics, the characteristics are transferred to the selected interface in the selected format.

19 Claims, 5 Drawing Sheets

FIG. 2

HOLD QUEUE INFORMATION MENU TRANSCRIPT

XYZ SERVICE

TO RECEIVE PUBLICATION OF HOLD QUEUE INFORMATION: PRESS OR ENTER 1

FOR VOICE OUTPUT TO CALLING DEVICE: PRESS OR ENTER 1
FOR TEXT OR GRAPHIC OUTPUT TO CALLING DEVICE: PRESS OR ENTER 2

CURRENT PEOPLE ON HOLD : 40
    AVERAGE TIME IN HOLD QUEUE TODAY : 70 MINUTES
    CONSULTANTS ON DUTY : 5
    CALL DURATION : 12 MINS
    YOUR POSITION : 25
    YOUR ESTIMATED WAIT TIME : 125 MINS
    TIME LEFT TO CLOSE OF BUSINESS : 240 MINS
    YOUR TRACKING NUMBER IS : 12930
    YOUR TOTAL TIME ON HOLD : 5 MINS
    ON-LINE WEB SITE : WWW.XYZSERVICE.COM
    PRESS 8 FOR MORE OPTIONS

FOR WEB ACCESS : PRESS OR ENTER 3

YOUR TRACKING NUMBER IS : 12930
    ON-LINE WEB SITE: WWW.XYZSERVICE.COM

FOR EMAIL : PRESS OR ENTER 4
FOR INSTANT MESSAGING : PRESS OR ENTER 5

ENTER YOUR NETWORK IDENTIFIER AND ENTER #

[TRANSMIT EMAIL OR INSTANT MESSAGE]

TO LOG THE SUBJECT MATTER OF YOUR CALL : PRESS OR ENTER 2

SELECT FROM ONE OF THE FOLLOWING SUBJECTS
        PRINTER ISSUE : PRESS OR ENTER 1
        MODEM ISSUE : PRESS OR ENTER 2
        MOUSE ISSUE : PRESS OR ENTER 3
        MONITOR ISSUE : PRESS OR ENTER 4
        OTHER HARDWARE ISSUE : PRESS OR ENTER 5
        UNIDENTIFIED ISSUE : PRESS OR ENTER 6

HOLD QUEUE POSITION PUBLICATION

CROSS-REFERENCE TO RELATED APPLICATIONS

The present application is related to the following copending applications, incorporated herein by reference:
(1) U.S. patent application Ser. No. 10/005,733;
(2) U.S. patent application Ser. No. 10/006,004;
(3) U.S. patent application Ser. No. 10/004,664; and
(4) U.S. patent application Ser. No. 10/005,828.

BACKGROUND OF THE INVENTION

1. Technical Field

The present invention relates in general to telecommunications and, in particular, to call hold queues. Still more particularly, the present invention relates to publishing call queue information to a caller in a caller specified format.

2. Description of the Related Art

Many companies provide telephone-based access to help staff, sales personnel, representatives, and automated menus. Where high telephone call traffic is typical in telephone access to a company's representatives, a PBX system receives the call and distributes the call to an automatic call distributor (ACD). ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. One way to alleviate some of the frustration associated with call queues is by alerting callers to a current position within the call queue and an estimated hold time.

For example, a call queue system may inform callers waiting in a call hold queue of the expected waiting time through a voice announcement prior to connection to an attendant. While periodically informing callers via voice announcement of a queue position informs callers of progress within the call queue, callers only receive limited information as to an expected wait time.

Therefore, in view of the foregoing, it would be advantageous to provide a method, system, and program for publishing call queue information to each caller that will aid each caller in understanding the relative position of each caller within a call queue. Further, it would be advantageous to provide a method, system, and program for publishing call queue information in a format most practical and accessible to the caller.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for publishing call queue position information to a caller in a caller specified format.

According to one aspect of the present invention, multiple characteristics of an on hold system are monitored. Then, responsive to a selection by a caller of a format for publishing the multiple characteristics, the multiple characteristics are transferred to the caller in the selected format.

According to another aspect of the present invention, multiple characteristics of an on hold system are monitored. Then, responsive to a selection by a caller of an interface for publishing the multiple characteristics, the multiple characteristics are transferred to the interface selected by the caller.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system, and program for publishing call hold queue information to a caller in a caller specified format are provided. In particular, hold queue information may include real-time information about call hold times, current call duration times, current call queue positions, current number and identity of representatives available, and other information indicative of current call system activity. In addition, hold queue information may include estimations, such as estimated wait times, estimated time per call, estimated time per subject of call, and other time estimations calculated from current and past call system activity. Further, hold queue information may include historical information, such as average overall wait times, average call duration times, and other historical information reflective of past call system activity. Moreover, historical information may be specified for the caller, such as an individual caller's average wait times from past calls.

For purposes of the present invention, call hold queue information may be published to a caller in multiple formats, such that the interface that is preferred by a caller is utilized to output the call hold queue information. Output formats may include, but are not limited to, voice output, text output, graphical output, video output, and other output formats that are available. Interfaces may include, but are not limited to, wired telephones, wireless telephones, personal computers, pervasive computing devices configured with appropriate telephony software and Internet connectivity, and network servers. The term "publication" preferably encompasses voice, text, graphical, video and other output forms of call hold queue information.

In addition, for purposes of the present invention, a caller may designate the intended subject matter of call. The intended subject matter may be selected by the caller from a menu of designated subjects. In addition, the intended subject matter may be provided by the caller in multiple formats including, but not limited to, voice, keypad, video, text, or other available formats.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

Figure 1:
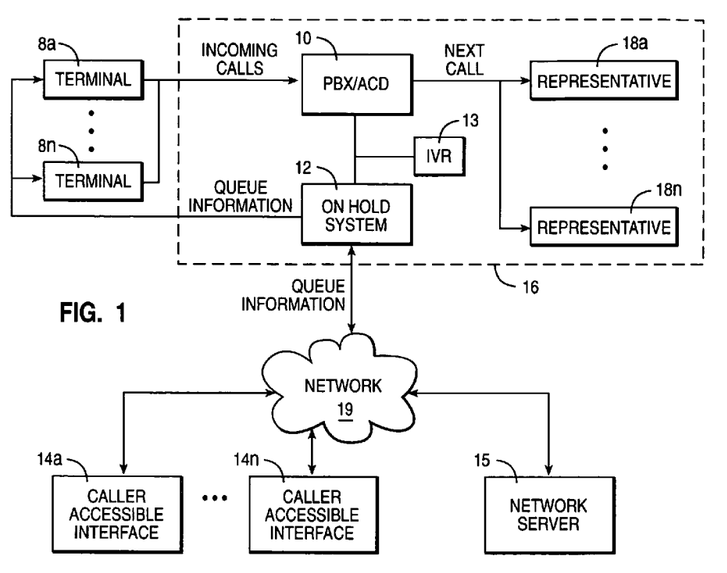
FIG. 1 depicts a block diagram of a network call or contact center system in which the present invention may be implemented.

With reference now to the figures, and, in particular, with reference now to FIG. 1, is an illustrative network call or contact center environment in which the present invention may be implemented. It will be appreciated by one with skill in the art that although a particular network environment is described below, the invention is not limited to use within the described network environment, rather, the inventive queue position advancement process may be implemented within any on-hold information service regardless of the telephony environment.

As illustrated, multiple incoming calls are received at a call center 16. In particular, a private branch exchange switch PBX 10 with automatic call distribution (ACD) ability receives incoming calls via truck 23, where trunk 23 is connected to a network of wireline, wireless, Internet Protocol (IP), and PSTN connections. In particular, PBX systems are well known in the art as switching systems designed to received telephone calls destined for call center 16 and to queue those call when a call handling agent is not available.

PBX 10 distributes incoming calls to multiple representative terminals 18a–18n via trunk 24. In particular, PBX 10 receives incoming calls via trunk 23 from multiple terminals 8a–8n, wherein terminals 8a–8n may represent, but are not limited to, conventional wireline telephone systems, wireless phones, video phones, personal computers, pervasive computing devices configured with appropriate telephony software and Internet connectivity, telephone stations, other PBXs, or switching systems.

In the description which follows, it will be assumed that all representative terminals 18a–18n are busy and therefore PBX 10 cannot respond to an incoming call by making a direct connection to one of representative terminals 18a–18n. As a result, PBX 10 is forced to place the incoming call on hold. In addition, PBX 10 determines the calling telephone number from caller ID or other methods.

After placing the incoming call on hold, the call and caller ID, time of call, and other information obtained by PBX 10 are forwarded to on hold system 12. On hold system 12 preferably creates a record based on the call and positions the call within a call queue. While in the present embodiment PBX 10 forwards calls to a single on hold system, in alternate embodiments, PBX 10 may forward calls to multiple on hold systems. In addition, on hold system 12 and other on hold systems may be coupled to PBX 10 or may be remotely accessed by PBX 10. Further, while in the present embodiment on hold system 12 is depicted as an independent system, on hold system 12 may also be incorporated within PBX 10.

While the call is on hold, an interactive voice response unit (IVRU) 13, coupled to PBX 10 and on hold system 12, may offer the caller a menu of available options for receiving call hold queue information for on hold system 12. In general, IVRU 13 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within on hold system 12. For purposes of the present invention, prompts to the caller may be in voice, text, video, and/or graphical formats depending on the interface receiving the prompt. In addition, a voice browser may be utilized to output voice XML pages to a caller and monitor responses from the caller, as described in U.S. patent application Ser. No. 10/006,004.

According to one advantage of the present invention, in offering the caller a menu of available options for receiving call hold queue information, the caller is offered the choice of the interface at which to receive the call hold queue information from on hold system 12. For example, the caller may select to receive the call hold queue information in a voice format as provided by IVRU 13. The voice format may be supported, for example, by a telephone or a personal computer with speakers for supporting the voice format. In another example, the caller may select to receive the call hold queue information in a text format at a digital text supporting device. In yet another example, the caller may select to receive the call hold queue information in a graphical format via a web page. Further, the caller may select to receive the call hold queue information at a network address, as an e-mail or instant message.

In order to achieve the advantage of the present invention, on hold system 12 may publish call hold queue information to multiple interfaces. In particular, on hold system 12 may publish call hold queue information to terminals 8a–8n, such that the caller receives the call hold queue information in a voice or text format at the device utilized to place the call. In addition, as will be further described, via a network 19, on hold system 12 may publish call hold queue information to caller accessible interfaces 14a–14n, which are independent of the device utilized by the caller to place the call. Further, on hold system 12 may publish call hold queue information to a network server 15 via network 19 according to a network identifier for a particular caller, where the caller may access the published call hold queue information in the form of an e-mail or instant message at a computing system where the caller is logged into network server under the network identifier.

Figure 2:
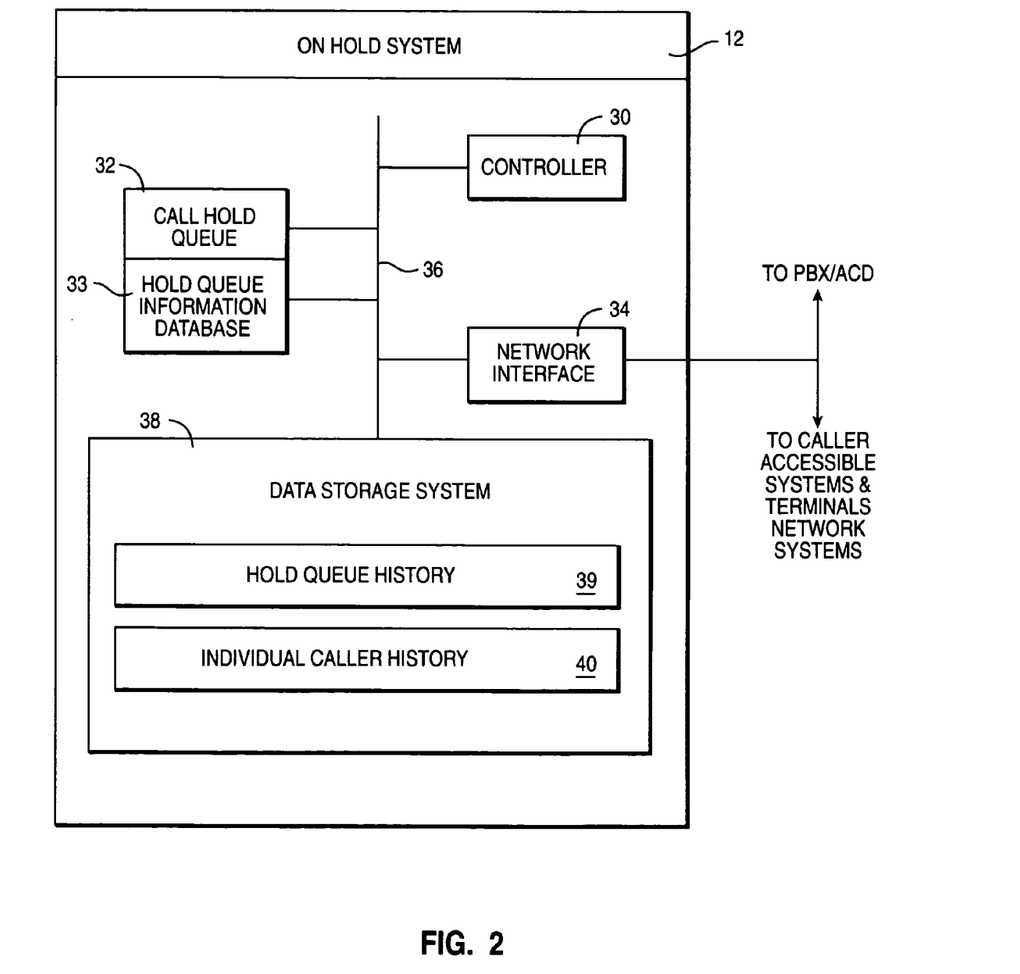
FIG. 2 illustrates a block diagram of an on hold system in accordance with the method, system, and program of the present invention.

Referring now to FIG. 2, is an illustrative block diagram of an on hold system in accordance with the method, system, and program of the present invention. As illustrated, on hold system 12 includes a controller 30, a call hold queue 32, hold queue information database 33, a network interface 34, and a data storage system 38 communicatively connected via a bus 36. Additional systems may be connected along bus 36 that are not depicted herein. In particular, controller 30 comprises conventional computer resources including, but are not limited to, at least one processor, memory, a data storage system, system software and application software, that function together to perform the functions described with reference to controller 30.

Network interface 34 preferably communicates with PBX 10, caller accessible systems and terminals via a telephone network or other networking system. In particular, network interface 34 receives transfers of calls from PBX 10 and then returns calls to PBX 10 when a call is the next in line within call hold queue 32.

Hold queue information database 33 is preferably coupled to call hold queue 32 to maintain characteristics of on hold system 12. In particular, hold queue information database 33 includes information about the current status of call hold queue 32. In addition, controller 30 preferably monitors past and current call queue activity in order to make wait time estimates. Wait time estimates are updated in hold queue information database 33. Moreover, data storage system 38 includes a hold queue history database 39 and an individual caller history database 40 from which controller 30 calculates historical averages for call hold queue 32 in general and historical averages for a particular caller or group of callers. Average wait times are then updated in hold queue information database 33.

In particular, when a call is received at on hold system 12, a call tracking number is assigned the call with placement in call hold queue 32. The call may be further identified for historical storage purposes by the caller ID of the terminal from which a call is made.

In the present invention, while a call is holding within call hold queue 32, the caller is preferably prompted to select from multiple options by IVRU 13. Particular to the present invention, options may include requesting a publication of the call hold queue information and updating the subject of the call in the call hold queue information. In addition, other options may be provided to a user including musical selections, news selections, third-party lines, and other call hold options that are known in the art.

If a caller requests a publication of the call hold queue information, then the caller is next prompted to indicate the method by which the caller would like to receive the publication. In particular, the method of receiving the publication may include both the format in which the publication is received and the interface at which the publication is received.

If the caller prefers to receive a voice or text publication of the call hold queue information at a terminal, then IVRU 13 initiates output of hold queue information database 33 in the requested format to the caller's terminal.

However, if the caller prefers to receive a voice, text, or graphical publication of the call hold queue information at a caller accessible interface, then IVRU 13 provides output of the call tracking number and a web or other network address for the caller to access. To access the call hold queue information, the caller utilizes a caller accessible interface, such as a personal computer system with a network connection, to access a web or other network page at the address and enters the call tracking number. In particular, on hold system 12 may function as a server location for the network address. Alternatively, on hold system 12 may be coupled to an additional server system that serves as the location for the network address and manages web related functions.

In response to receiving a call tracking number entered via the web page, controller 30 verifies the call tracking number and controls publication of the contents of hold queue information database 33 to the call accessible interface from which the caller entered the call tracking number.

Further, if the caller prefers to receive an e-mail or instant message of the call hold queue information that the caller may then access at a caller accessible system or other computing system with network connectivity, then IVRU 13 requests a network identifier of either an e-mail address or instant messaging identifier. In particular, a single identifier may be utilized to represent an e-mail address and instant messaging identifier, such that if the caller is currently logged onto a network system supporting the network identifier, then the call hold queue information is transmitted as an instant message; if the caller is not logged onto the network system, then the call hold queue information is stored as an e-mail.

According to another advantage of the present invention, a caller may designate publication preferences that are stored in individual call history database 90 or an alternate universal storage system. Publication preferences are preferably stored according to at least one caller ID and accessed when a caller ID is detected with an incoming call.

In particular, publication preferences may designate the types of information from hold queue information database 33 that the caller prefers. In addition, a caller may indicate a preference for the interface and format in which hold queue information should be published to the caller. Further, where the caller is receiving the information via a web page or other graphical format, the caller may designate graphical preferences for publication.

According to another advantage of the present invention, each caller may indicate the anticipated subject matter of the call, where the anticipated subject matter for each call is stored in hold queue information database 33. In particular, the caller may select the subject matter of the call in order to determine which of multiple call queues a call should be positioned within. In addition, if necessary, a caller may further select to update the anticipated subject matter of the call while on hold. Updating a subject matter may adjust which call queue a call is held within.

Figure 3:
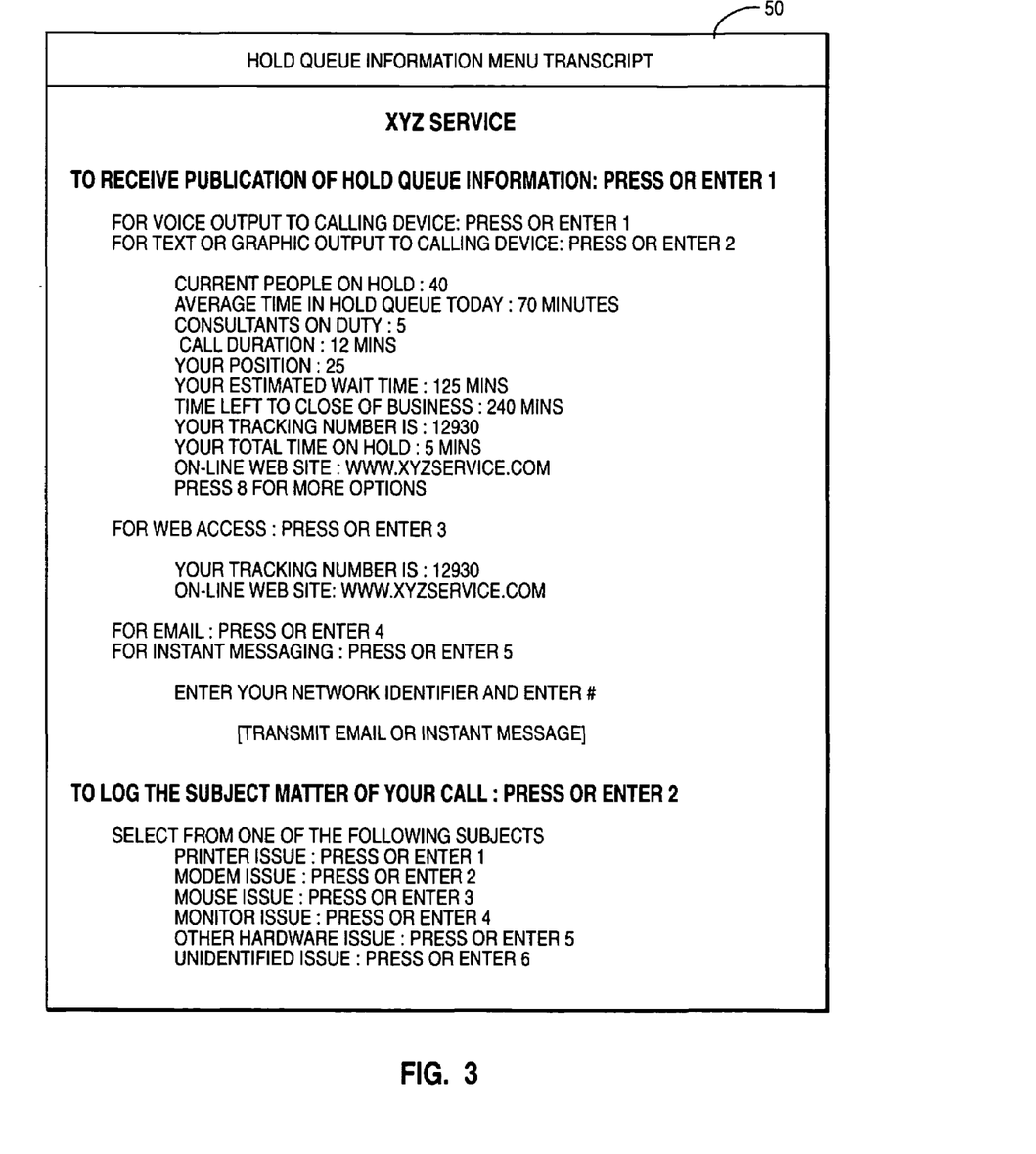
FIG. 3 depicts an illustrative hold queue information menu transcript in accordance with the method, system, and program of the present invention.

With reference now to FIG. 3, is an illustrative hold queue information menu transcript in accordance with the method, system, and program of the present invention. As illustrated, a transcript 50 includes textual promptings and responses to selections. According to one embodiment of the present invention, transcript 50 is stored in a on hold system and utilized by an IVRU for interaction with a caller.

First, the caller is prompted to receive a publication of hold queue information by pressing or entering "1". If the caller selects to receive a publication, then the caller is prompted to select the output format and interface for publication. The information to be published to the caller follows and may be output by voice, text, graphics, or video.

Second, the caller is prompted to log the subject matter of the call by pressing or entering "2". If the caller selects to log the subject matter of the call, then the caller is prompted to select from among multiple pre-defined subject matter.

Figure 4:
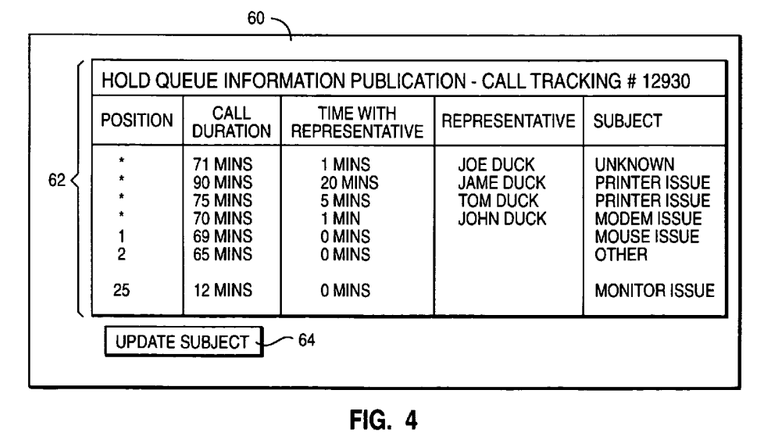
FIG. 4 illustrates a graphical representation of a hold queue information publication in accordance with the method, system, and program of the present invention.

Referring now to FIG. 4, is a graphical representation of a hold queue information publication in accordance with the method, system, and program of the present invention. As illustrated, a display interface 60 displays a hold queue information publication 62, in response to entry of a current call tracking number.

In the present example, the caller has specified a preference for the categories of "queue position", "call duration", "time with representative", "representative", and "subject matter" to be displayed. In alternate embodiments, other callers may specify alternate categories to be displayed within hold queue information publication 62. In addition, in alternate embodiments, other callers may specify alternate graphical formats for display of hold queue information publication 62.

In addition, display interface 60 includes a selectable button 64 where, in response to selection of selectable button 64, a caller is prompted with types of subject matter to assign to a call.

Figure 5:
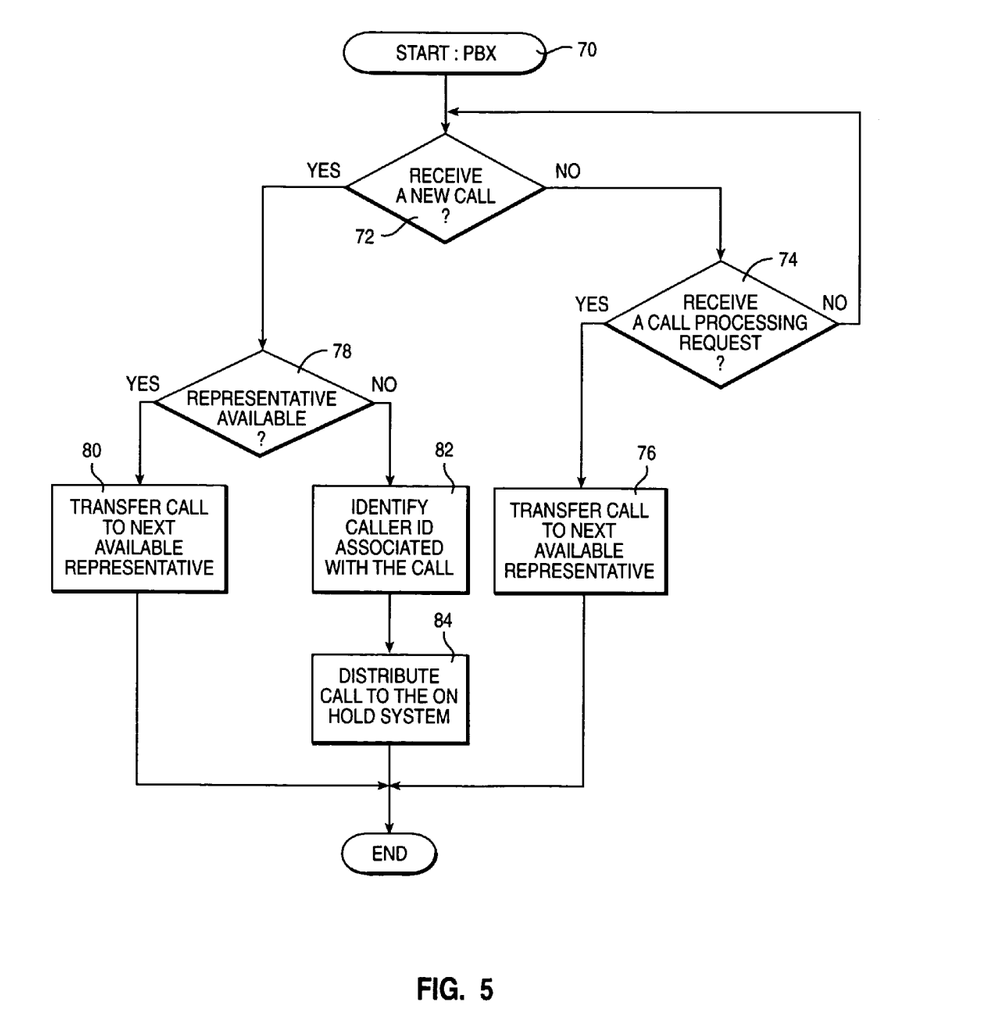
FIG. 5 depicts a high level logic flowchart of a process and program for controlling a PBX system within a call center in accordance with the method, system, and program of the present invention.

With reference now to FIG. 5, depicts a high level logic flowchart of a process and program for controlling a PBX system within a call center in accordance with the method, system, and program of the present invention. As illustrated, the process starts at block 70 and thereafter proceeds to block 72.

Block 72 depicts a determination as to whether a new call is received. If a new call is received, then the process passes to block 78. If a new call is not received, then the process passes to block 74. Block 74 illustrates a determination as to whether or not a call processing request is received. When a call is at the top of the call queue, the call is preferably transferred back to the PBX with a call processing request. If a call processing request is not received, then the process passes to block 72. If a call process request is received, then the call is transferred to the next available representative, as depicted at block 74, and the process ends.

Block 78 illustrates a determination as to whether or not a representative is available. If a representative is available, then the call is transferred to the next available representative, as illustrated at block 80, and the process ends. If a representative is not available, then the process passes to block 82. Block 82 depicts identifying the caller ID associated with the call. Next, block 84 illustrates distributing the call to the on hold system, and the process ends.

Figure 6:
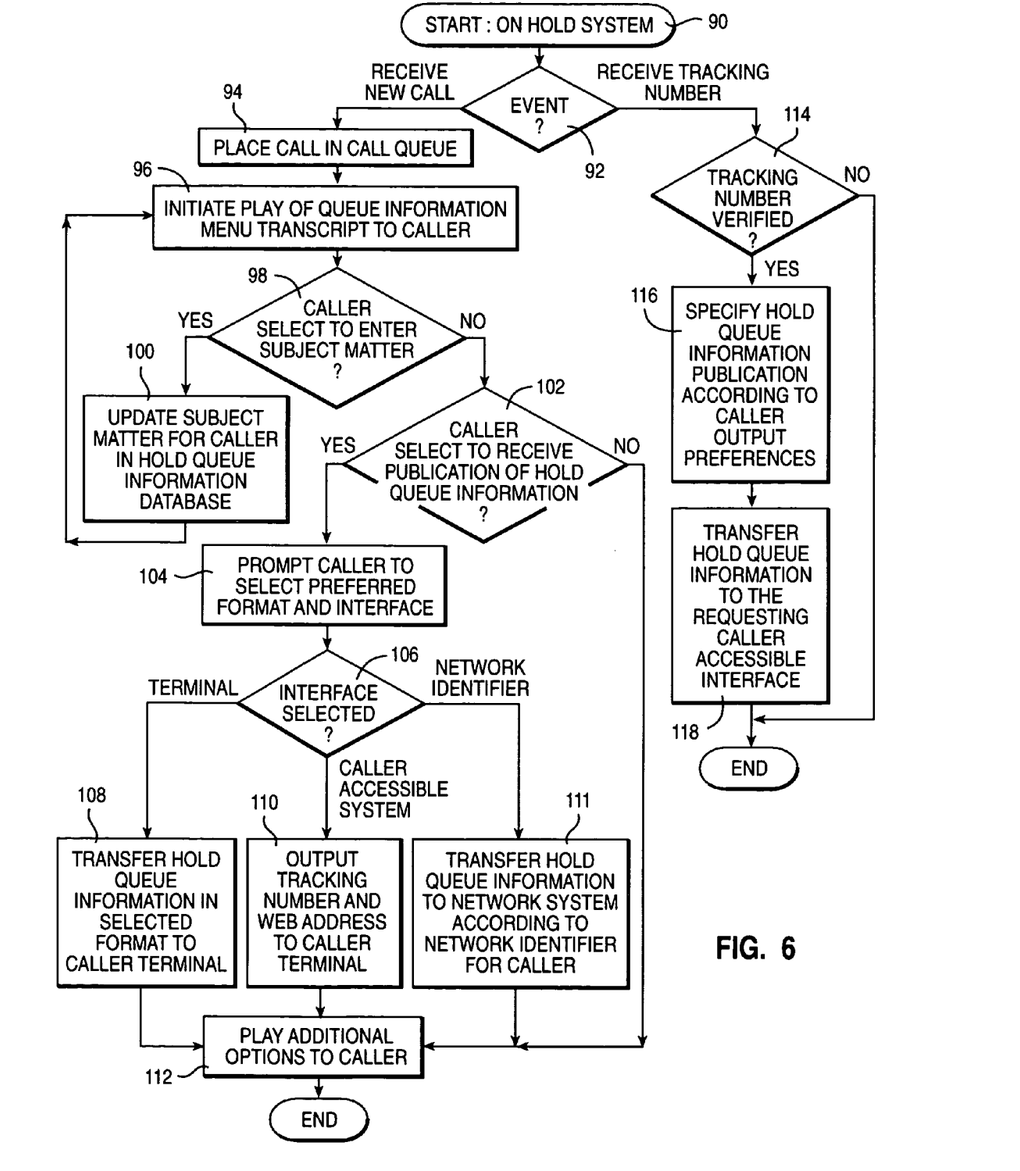
FIG. 6 illustrates a high level logic flowchart of a process and program for controlling an on hold system in accordance with the method, system, and program of the present invention.

Referring now to FIG. 6, illustrates a high level logic flowchart of a process and program for controlling an on hold system in accordance with the method, system, and program of the present invention. As depicted, the process starts at block 90 and thereafter proceeds to block 92.

Block 92 illustrates a determination as to the event that occurred when an event occurs. If a new call is received, then the process passes to block 92. If a call tracking number is received from a caller accessible interface, then the process passes to block 114.

Block 94 depicts placing the call in the call queue. In placing the call in the call queue, a record of the call is placed in the call hold queue information database in association with a call tracking number and any history associated with a caller according to the caller ID of the call. Next, block 96 illustrates initiating play of the queue information menu transcript to the caller, and the process passes to block 98.

Block 98 illustrates a determination as to whether a caller selects to enter subject matter. If a caller selects to enter subject matter, then the subject matter for the caller is updated in the hold queue information database, as depicted at block 100, and the process passes to block 96. If a caller does not select to enter subject matter, then the process passes to block 102.

Block 102 depicts a determination as to whether a caller selects to receive a publication of hold queue information. If the caller does not select to receive a publication of hold queue information, then the process passes to block If a new call is received, then the process passes to block 78. If the caller does select to receive a publication of hold queue information, then the process passes to block 104.

Block 104 illustrates prompting the caller to select a preferred format and interface for receiving the publication of hold queue information. Next, block 106 depicts a determination as to the interface selected.

If a terminal is selected, then the hold queue information is transferred, in the selected format, filtered according to any caller output preferences, to the caller terminal, as illustrated at block 108.

If a caller accessible interface is selected, then the call tracking number for the call and the network address for the call service are output to the caller via voice or text, as depicted at block 110.

If a network identifier is selected, then the hold queue information is transferred, filtered according to any caller output preferences, to a network server according to the network identifier. In particular, the network identifier may include an electronic mail (e-mail) address or instant messaging address.

Following the steps depicted at blocks 108, 110, and 111, block 112 illustrates playing additional options to the caller, and the process ends.

Returning to block 114, a determination is made as to whether a call tracking number is current. If the call tracking number is not current, then the process ends. If a call tracking number is current, then the process passes to block 116. Block 116 illustrates specifying the hold queue information for the call tracking number according to caller output preferences. Next, block 118 depicts transferring the specified hold queue information to the requesting caller accessible interface, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for publishing call queue characteristics comprising:

monitoring a plurality of characteristics of an on hold system;

presenting a caller currently waiting on a call within said on hold system with a selectable menu of a plurality of separate available formats and a plurality of separate available output interfaces for selection by said caller for publication of said plurality of characteristics, wherein said plurality of separate available output interfaces comprise at least a calling device used by said caller to place said call, a web site, and a messaging account; and responsive to a selection by said caller of a particular format from said plurality of separate available formats and a particular output interface from said plurality of separate available output interfaces, facilitating transfer of said plurality of characteristics to said caller at said particular output interface for output in said particular format.

2. The method for publishing call queue characteristics according to claim 1, wherein monitoring a plurality of characteristics further comprises:

monitoring at least one from among a current activity status of said on hold system, an estimated activity status of said on hold system, a historical average activity status of said on hold system, and a historical average activity status of at least one current caller on hold within said on hold system.

3. The method for publishing call queue characteristics according to claim 1, wherein said selectable menu of said plurality of separate formats for publishing said plurality of characteristics further comprises an audio format, a text format, and a graphical format.

4. The method for publishing call queue characteristics according to claim 1, wherein facilitating transfer of said plurality of characteristics further comprises:

responsive to said selection by said caller of said web site as said particular output interface, prompting said caller via said calling device with a tracking number identifying said call and a particular network address at which said plurality of characteristics are accessible responsive to entry of said tracking number; and enabling said web site at said particular network address to provide output of said plurality of characteristics in said particular output format responsive to caller access to said particular network address and entry of said tracking number.

5. The method for publishing call queue characteristics according to claim 1, wherein monitoring a plurality of characteristics further comprises:

monitoring an expected subject matter selection of a plurality of calls currently on hold within said on hold system.

6. The method for publishing call queue characteristics according to claim 1, further comprising:

filtering a preferred selection from among said plurality of characteristics according to output preferences for said caller; and only facilitating transfer of said preferred selection from among said plurality of characteristics to said caller at said particular output interface for output in said particular format.

7. A system for publishing call queue characteristics comprising:

an on hold system for managing a plurality of calls waiting on hold;

means for monitoring a plurality of characteristics of said on hold system;

means for presenting a caller currently waiting on a call within said on hold system with a selectable menu of a plurality of separate available formats and a plurality of separate available output interfaces for selection by said caller for publication of said plurality of characteristics, wherein said plurality of separate available output interfaces comprise at least a calling device used by said caller to place said call, a web site, and a messaging account; and means, responsive to a selection by said caller of a particular format from said plurality of separate available formats and a particular output interface from said plurality of separate available output interfaces, for facilitating transfer of said plurality of characteristics to said caller at said particular output interface for output in said particular format.

8. The system for publishing call queue characteristics according to claim 7, wherein said means for monitoring a plurality of characteristics further comprises:

means for monitoring at least one from among a current activity status of said on hold system, an estimated activity status of said on hold system, a historical average activity status of said on hold system, and a historical average activity status of at least one current caller on hold within said on hold system.

9. The system for publishing call queue characteristics according to claim 7, wherein said selectable menu of said plurality of separate formats for publishing said plurality of characteristics further comprises an audio format, a text format, and a graphical format.

10. The system for publishing call queue characteristics according to claim 7, wherein said means for facilitating transfer of said plurality of characteristics further comprises:

means, responsive to said selection by said caller of said web site as said particular output interface, for prompting said caller via said calling device with a tracking number identifying said call and a particular network address at which said plurality of characteristics are accessible responsive to entry of said tracking number; and means for enabling said web site at said particular network address to provide output of said plurality of characteristics in said particular output format responsive to caller access to said particular network address and entry of said tracking number.

11. The system for publishing call queue characteristics according to claim 7, wherein said means for monitoring a plurality of characteristics further comprises:

means for monitoring an expected subject matter selection of said plurality of calls currently on hold within said on hold system.

12. The system for publishing call queue characteristics according to claim 7, further comprising:

means for filtering a preferred selection from among said plurality of characteristics according to output preferences for said particular caller; and means for only facilitating transfer of said preferred selection from among said plurality of characteristics to said caller at said particular output interface for output in said particular format.

13. A computer program product for publishing call queue characteristics, said computer program product comprising:

a recording medium;

means, recorded on said recording medium, for monitoring a plurality of characteristics of an on hold system;

means, recorded on said recording medium, for presenting a caller currently waiting on a call within said on hold system with a selectable menu of a plurality of separate available formats and a plurality of separate available output interfaces for selection by said caller for publication of said plurality of characteristics, wherein said plurality of separate available output interfaces comprise at least a calling device used by said caller to place said call, a web site, and a messaging account; and means, recorded on said recording medium, responsive to a selection by said caller of a particular format from said plurality of separate available formats and a particular output interface from said plurality of separate available output interfaces, for enabling transfer of said plurality of characteristics to a particular caller at said particular output interface for output in said particular format specified by said particular caller.

14. The computer program product for publishing call queue characteristics according to claim 13, wherein said means for enabling transfer of said plurality of characteristics further comprises:

means, recorded on said recording medium, for, responsive to said selection by said caller of said web site as said particular output interface, prompting said caller via said calling device with a tracking number identifying said call and a particular network address at which said plurality of characteristics are accessible responsive to entry of said tracking number; and means, recorded on said recording medium, for enabling said web site at said particular network address to provide output of said plurality of characteristics in said particular output format responsive to caller access to said particular network address and entry of said tracking number.

15. The computer program product for publishing call queue characteristics according to claim 13, wherein said means for monitoring a plurality of characteristics further comprises:

means, recorded on said recording medium, for monitoring an expected subject matter selection of said plurality of calls currently on hold within said hold system.

16. The computer program product for publishing call queue characteristics according to claim 13, further comprising:

means, recorded on said recording medium, for filtering a preferred selection from among said plurality of characteristics according to output preferences for said particular caller; and means, recorded on said recording medium, for only facilitating transfer of said preferred selection from among said plurality of characteristics to said caller at said particular output interface for output in said particular format.

17. The method for publishing call queue characteristics according to claim 1, wherein facilitating transfer of said plurality of characteristics further comprises:

responsive to said selection by said caller of said messaging account as said particular output interface, prompting said caller via said calling device to enter an identifier for said messaging account; and responsive to caller entry of a particular identifier for said messaging account, sending a communication including said plurality of characteristics via a network to an account server serving said particular identifier.

18. The system for publishing call queue characteristics according to claim 7, wherein said means for facilitating transfer of said plurality of characteristics further comprises:

means, responsive to said selection by said caller of said messaging account as said particular output interface, for prompting said caller via said calling device to enter an identifier for said messaging account; and means, responsive to caller entry of a particular identifier for said messaging account, for sending a communication including said plurality of characteristics via a network to an account server serving said particular identifier.

19. The computer program product for publishing call queue characteristics according to claim 13, further comprising, means, recorded on said recording medium, for prompting said caller via said calling device to enter an identifier for a messaging account, responsive to said selection by said caller of said messaging account as said particular output interface; and means, recorded on said recording medium, for sending a communication including said plurality of characteristics via a network to an account server serving a particular identifier, responsive to caller entry of said particular identifier for said messaging account.

* * * * *